United States Patent
Brown et al.

(10) Patent No.: US 6,196,237 B1
(45) Date of Patent: *Mar. 6, 2001

(54) METHODS FOR WASHING CORES OF CORED LETTUCE HEADS

(75) Inventors: Richard S. Brown, Chualar; Eugene D. Rizzo, Pacific Grove, both of CA (US)

(73) Assignee: Fresh Express Corp., Salinas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/346,633

(22) Filed: Jul. 1, 1999

Related U.S. Application Data

(60) Continuation of application No. 09/234,152, filed on Jan. 19, 1999, now Pat. No. 5,954,067, which is a division of application No. 09/144,792, filed on Sep. 1, 1998.

(51) Int. Cl.[7] .................................................... B08B 3/02
(52) U.S. Cl. .................... 134/25.3; 134/22.1; 134/22.18; 134/22.19; 134/23; 134/133; 134/166 R; 134/169 R; 426/324; 426/334; 426/335; 426/392; 426/442
(58) Field of Search ................................ 134/22.1, 22.18, 134/22.19, 23, 25.3, 133, 166 R, 169 R; 426/324, 334, 335, 392, 442

(56) References Cited

U.S. PATENT DOCUMENTS

| | | |
|---|---|---|
| 910,882 | 1/1909 | Truesdell . |
| 1,661,602 | 3/1928 | Dary . |
| 2,003,326 | 6/1935 | Wellman . |
| 2,170,378 | 8/1939 | Orstrom . |
| 2,214,944 | 9/1940 | Vogt . |
| 2,294,668 | 9/1942 | Karas . |
| 2,335,913 | 12/1943 | Buttery . |
| 2,424,693 | 7/1947 | Jones . |
| 2,611,709 | 9/1952 | Plagge . |
| 2,627,862 | 2/1953 | Flusher . |
| 2,815,621 | 12/1957 | Carter . |
| 2,920,967 | 1/1960 | Heinemann . |
| 2,925,210 | 2/1960 | Fallert . |
| 2,955,940 | 10/1960 | Williams . |
| 2,967,777 | 1/1961 | Grindrod . |
| 3,055,568 | 9/1962 | Zalking . |
| 3,128,934 | 4/1964 | Jacke . |
| 3,203,437 | 8/1965 | Faust . |
| 3,204,825 | 9/1965 | Underwood . |

(List continued on next page.)

FOREIGN PATENT DOCUMENTS

| | | |
|---|---|---|
| 1025786 | 2/1978 | (CA) . |
| 2842204 | 4/1980 | (DE) . |
| 025334 | 1/1988 | (EP) . |
| 402436 | 12/1933 | (GB) . |
| 764796 | 1/1957 | (GB) . |
| 1378140 | 12/1974 | (GB) . |
| 60-126032 | 7/1985 | (JP) . |

OTHER PUBLICATIONS

Wiley Encyclopedia of Packaging Technology J. Wiley & Sons, 1986 pp. 24–29, 66–81.
Packaging, Japan, Nov. 198, pp. 17–22.
Chemical Engineering, vol. 64.
Modern Packaging, Aug. 1941, pp. 44, 45.
"The King PAK" eight sided fiberboard IBC from Packaging Review, May 1980, 1 page.
Wiley Encyclopedia of Packaging Technology (WFPT), John Wiley & Sons, 1986, p. 493.

*Primary Examiner*—S. Carrillo
(74) *Attorney, Agent, or Firm*—Patrick F. Bright

(57) ABSTRACT

A method for washing cored heads of lettuce includes placing such heads in a position with their cored holes facing downwardly toward an upwardly-directed spray of an aqueous solution, directing such a spray into, and washing the holes, then pushing the heads from that position onto a conveyor.

3 Claims, 7 Drawing Sheets

U.S. PATENT DOCUMENTS

| | | |
|---|---|---|
| 3,220,157 | 11/1965 | Buchner . |
| 3,261,533 | 7/1966 | Ripking . |
| 3,407,078 | 10/1968 | Schlichter . |
| 3,419,400 | 12/1968 | Hayhurst et al. . |
| 3,450,542 | 6/1969 | Badran . |
| 3,473,589 | 10/1969 | Gotz . |
| 3,484,017 | 12/1969 | O'Donnell . |
| 3,521,806 | 7/1970 | Esty . |
| 3,715,860 | 2/1973 | Esty . |
| 3,747,614 | 7/1973 | Buedingen . |
| 3,939,287 | 2/1976 | Orwig et al. . |
| 3,945,558 | 3/1976 | Elder . |
| 3,957,179 | 5/1976 | Bamburg et al. . |
| 3,990,358 * | 11/1976 | Cade ................................. 99/534 |
| 3,991,543 | 11/1976 | Shaw . |
| 4,001,443 | 1/1977 | Dave . |
| 4,006,561 | 2/1977 | Toma et al. . |
| 4,039,350 | 8/1977 | Bucy . |
| 4,055,931 | 11/1977 | Myers . |
| 4,061,785 | 12/1977 | Nishino et al. . |
| 4,066,401 | 1/1978 | Solomon . |
| 4,079,152 | 3/1978 | Bedrosian et al. . |
| 4,089,417 | 5/1978 | Osborne . |
| 4,105,153 | 8/1978 | Locke . |
| 4,168,597 | 9/1979 | Cayton ................................. 53/127 |
| 4,209,538 | 6/1980 | Woodruff . |
| 4,224,347 | 9/1980 | Woodruff . |
| 4,241,558 | 12/1980 | Gidewall et al. . |
| 4,258,848 | 3/1981 | Akao et al. . |
| 4,268,555 | 5/1981 | Kantz . |
| 4,296,860 | 10/1981 | Hsu et al. . |
| 4,343,429 | 8/1982 | Cherry . |
| 4,411,921 | 10/1983 | Woodruff . |
| 4,422,466 | 12/1983 | Schafer . |
| 4,423,080 | 12/1983 | Bedrosian et al. . |
| 4,454,945 | 6/1984 | Jabarin . |
| 4,515,266 | 5/1985 | Myers . |
| 4,516,692 | 5/1985 | Croley . |
| 4,610,885 | 9/1986 | Tait . |
| 4,670,227 | 6/1987 | Smith . |
| 4,702,408 | 10/1987 | Powlenko . |
| 4,744,199 | 5/1988 | Gannon . |
| 4,744,203 | 5/1988 | Brockwell et al. . |
| 4,756,417 | 7/1988 | Teixera . |
| 4,759,642 | 7/1988 | Van Erden et al. . |
| 4,813,791 | 3/1989 | Cullen et al. . |
| 4,840,271 | 6/1989 | Garwood . |
| 4,863,287 | 9/1989 | Marisk . |
| 4,886,372 | 12/1989 | Greengrass et al. . |
| 4,930,906 | 6/1990 | Hemphill . |
| 4,962,777 * | 10/1990 | Bell ........................................ 134/63 |
| 4,963,287 | 10/1990 | Hutchings et al. . |
| 4,967,776 | 11/1990 | Folmar . |
| 5,044,776 | 9/1991 | Schramer et al. . |
| 5,078,509 | 1/1992 | Center et al. . |
| 5,093,080 | 3/1992 | Keller . |
| 5,121,589 | 6/1992 | Ventura et al. .......................... 53/448 |
| 5,226,972 * | 7/1993 | Bell ..................................... 134/25.1 |
| 5,290,580 | 3/1994 | Floyd et al. . |
| 5,316,778 | 5/1994 | Hougham ............................. 426/324 |
| 5,346,089 | 9/1994 | Brown et al. . |
| 5,354,569 | 10/1994 | Brown et al. . |
| 5,402,906 | 4/1995 | Brown et al. . |
| 5,421,250 | 6/1995 | Beaumont ............................... 99/636 |
| 5,437,731 * | 8/1995 | St Martin ............................... 134/10 |
| 5,522,410 | 6/1996 | Meilleur . |
| 5,640,643 | 6/1997 | Hoitz et al. . |
| 5,713,101 | 2/1998 | Jackson . |
| 5,727,690 | 3/1998 | Hofmeister ........................ 209/139.1 |
| 5,728,439 | 3/1998 | Carlblom et al. . |
| 5,885,002 | 3/1999 | Reiss . |
| 5,954,067 * | 9/1999 | Brown et al. ....................... 134/25.3 |
| 6,041,797 | 3/2000 | Casselman . |

\* cited by examiner

METHODS FOR WASHING CORES OF CORED LETTUCE HEADS

CROSS-REFERENCE AS TO RELATED APPLICATION

This application is a continuation of U.S. patent application Ser. No. 09/234,152, filed Jan. 19, 1999, in the United States Patent and Trademark Office ("PTO"), and now issued as U.S. Pat. No. 5,954,067, issued on Sep. 21, 1999. The '152 application is a division of U.S. patent application Ser. No. 09/144,792, filed Sep. 1, 1998, in the PTO.

This invention relates to an apparatus and methods for washing the cored area of a lettuce head.

These apparatus, in preferred embodiments, include a perforated platform, preferably a perforated platform, connected to and supporting a tripod, or other lettuce head guide, that fits into the core hole of a cored lettuce head, and orients the lettuce head during washing of the core hole. Preferably, the guide includes three L-shaped vanes that project upwardly from the support platform.

In preferred embodiments, a support platform includes supports for a lettuce head holder. This holder has an opening sufficiently large to permit the guide to project through the opening with the holder in a first position over the guide. The opening in the holder includes, near the top of the holder, a recess, preferably of sufficient size and shape to receive and support a cored head of lettuce. In the first position, the core hole of a lettuce head is placed over the guide and into the recess of the holder, with the lettuce head otherwise resting in the recess of the holder.

The holder is pivotally connected to two holder supports. The two holder supports are connected to the support platform so that the holder can move upwardly from the first, preferably horizontal position, where the guide projects through the opening in the holder, to a second raised position at a distance of 45° to 75° from the first position. This movement to a second position unseats the cored area of the lettuce head from the guide and propels the lettuce head onto a conveyor that carries the cored, washed lettuce head from the washing apparatus.

Below the perforated platform is a housing for a chamber that stores and dispenses aqueous, lettuce head washing solution. Inside this chamber is an inlet valve through which such a solution enters the chamber. This inlet valve is connected to a float mechanism. The inlet valve maintains a predetermined, adjustable level, usually at or near the middle of the chamber.

Inside the chamber are a screen and screen housing through which the aqueous solution exits the chamber and flows, via lines and valves, into a pressurizable chamber. At least one valve is a check valve that prevents the aqueous solution from escaping the pressurized chamber, and flowing upstream toward the screen and screen housing. Inside the pressurized chamber is a syphon, preferably of cylindrical shape, with an opening at a distal end near the bottom of the pressurizable chamber. Aqueous solution enters the syphon from this distal end, and flows, under pressure, upwardly toward a nozzle at the proximal end of the syphon. The pressurized chamber also includes an opening for admitting a pressurizing gas such as air into the chamber. In preferred embodiments, the nozzle at the proximal end of the syphon discharges a spray of aqueous solution upwardly into and through the area within the guide, and into and around the cored area of a lettuce head to wash the head efficiently.

The washing apparatus also includes pressure driven timers. These timers control the time for aqueous solution to exit the chamber and flow into the pressurizable chamber; start and stop the flow of pressurizing air or other gas into the pressurizable chamber; initiate and sustain the spray from the nozzles into the area with the guide and into the core hole of a cored lettuce head placed on the guide; control the time for ejecting the cored lettuce head; and control the time delay between one wash cycle and another.

DETAILED DESCRIPTION OF THE INVENTION

Figure 1:
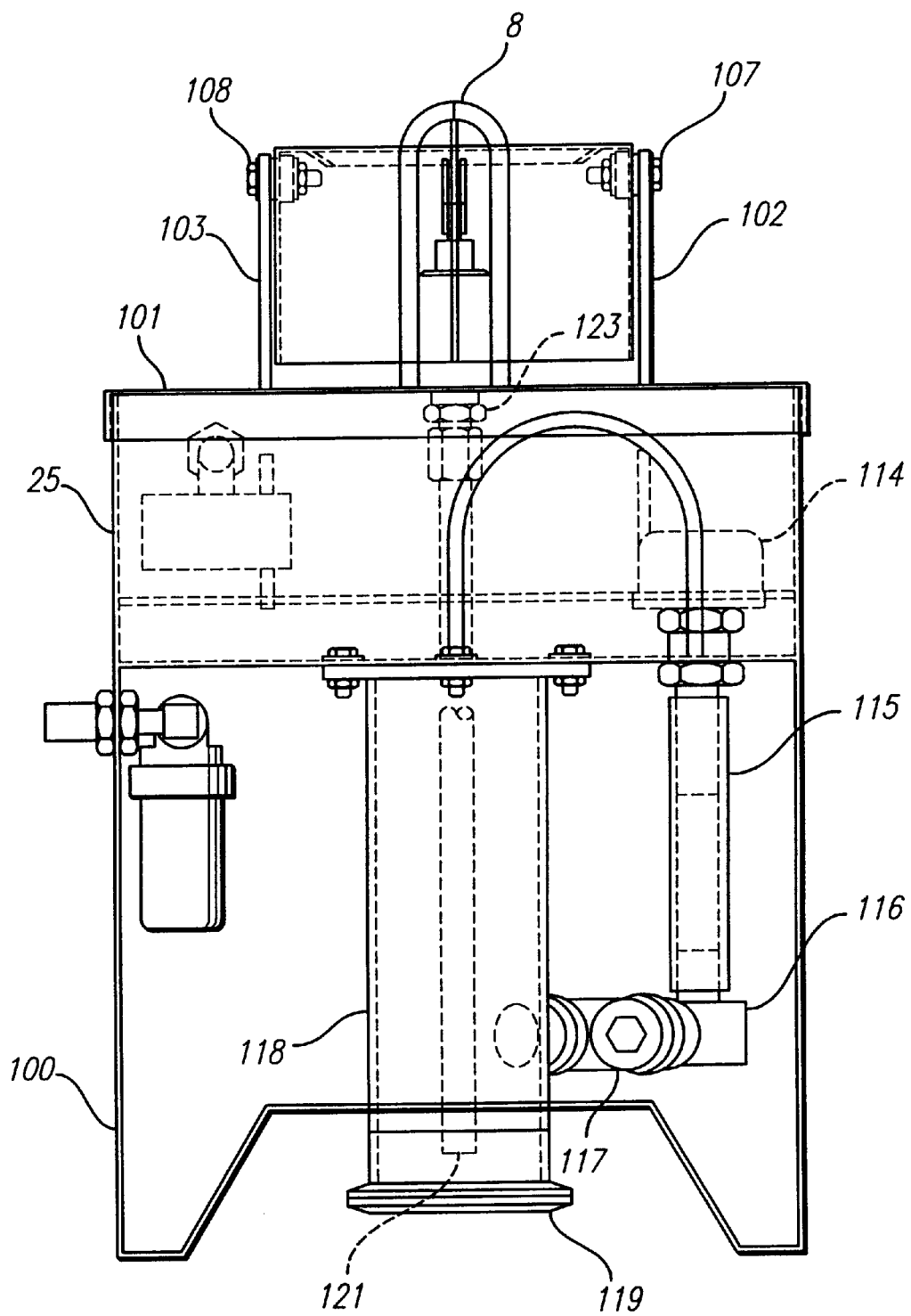
FIG. 1 shows an end elevation view in cross-section of a preferred embodiment of the cored lettuce head washing apparatus of this invention.
Figure 2:
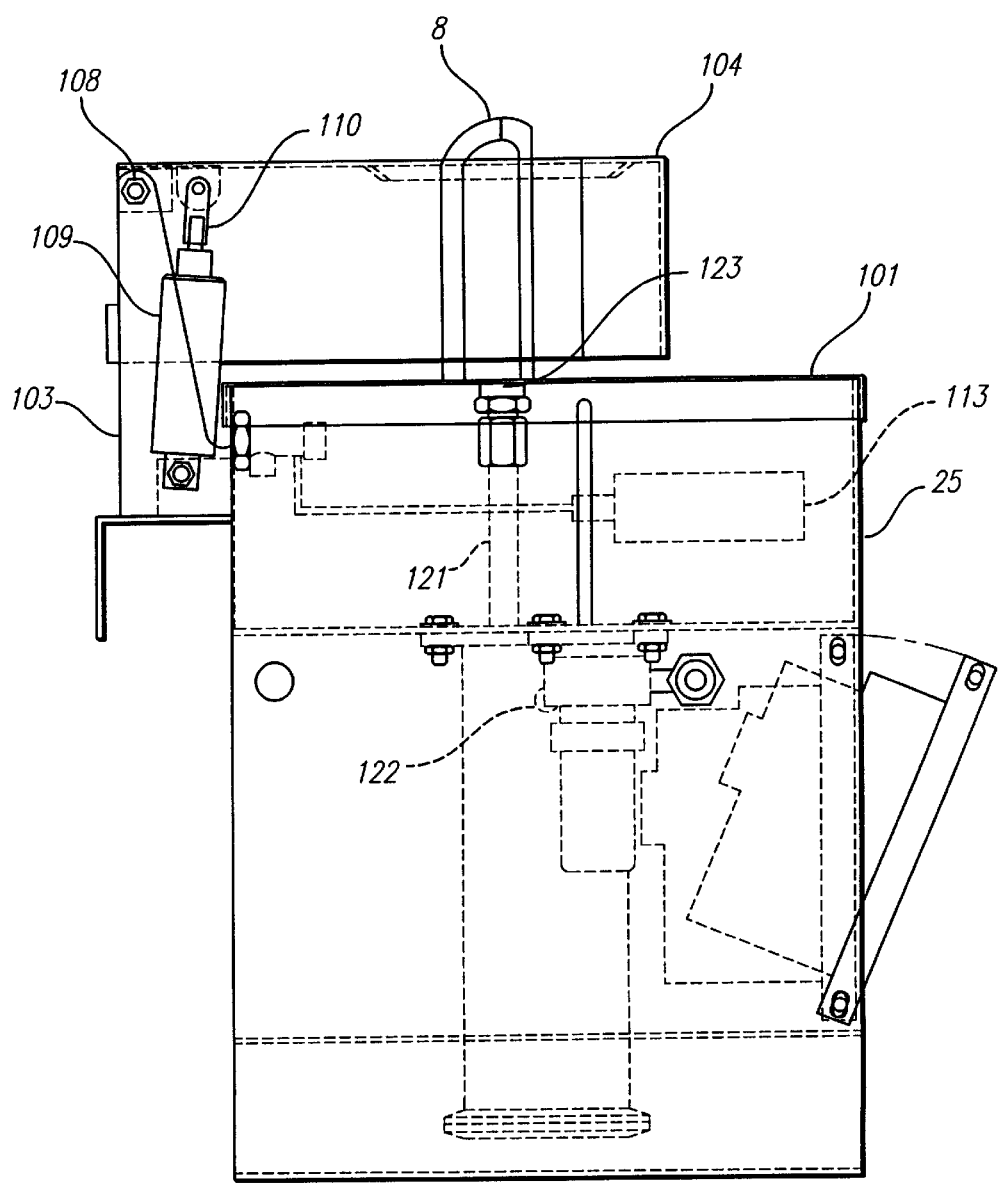
FIG. 2 is a side elevation view in cross-section of the cored lettuce head washing apparatus shown in FIG. 1.
Figure 3:
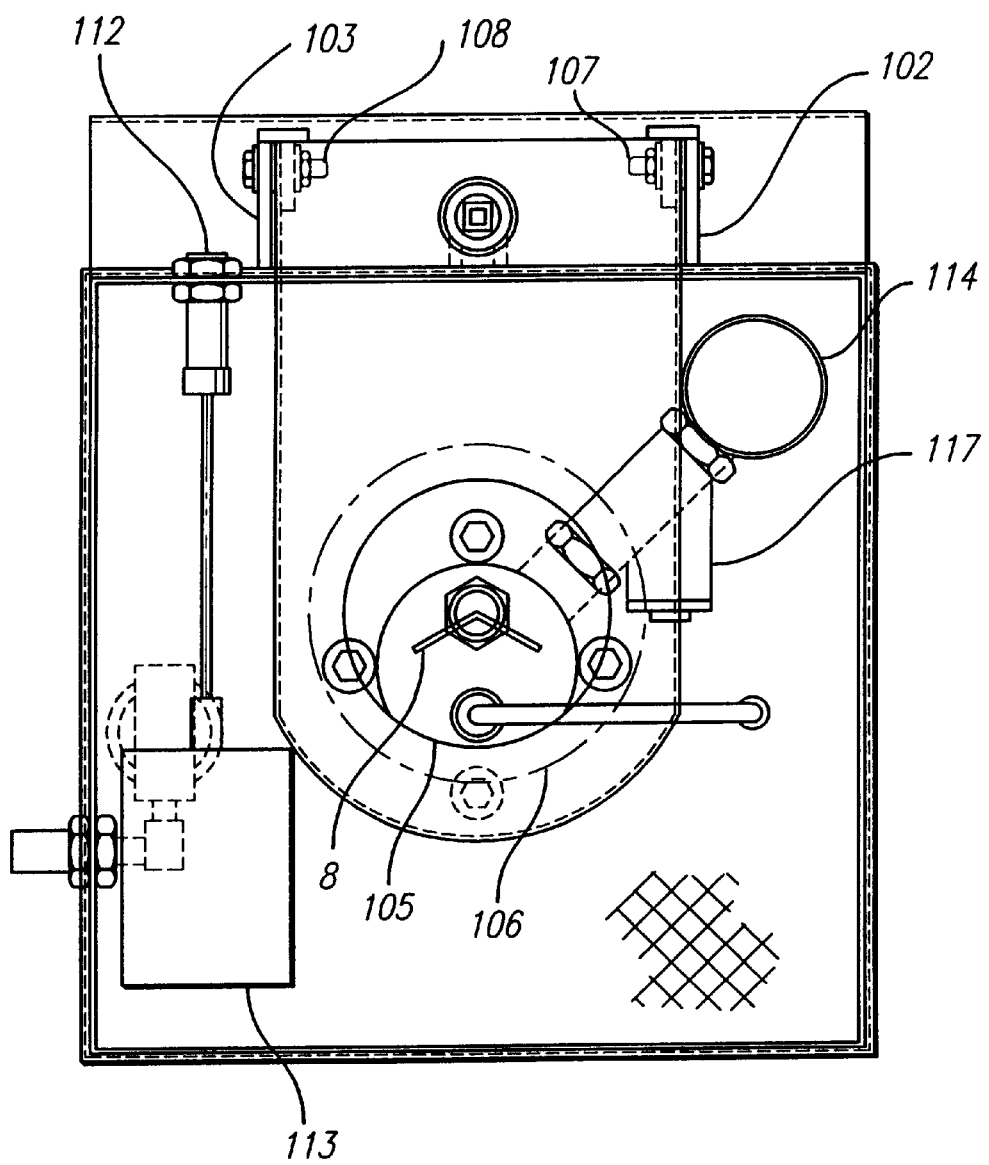
FIG. 3 is a top plan view of the cored lettuce head washing apparatus shown in FIGS. 1 and 2.

FIG. 1 shows lettuce head washing apparatus 100. Apparatus 100 includes perforated platform 101 that supports, and is connected to guide 8. Guide 8 includes three L-shaped vanes, that project upwardly from platform 101.

Also attached to washing apparatus 100 are supports 102 and 103 for platform 104. Platform 104 includes opening 105 sufficiently large in diameter to permit guide 8 to project through opening 105 with platform 104 in the horizontal position shown in FIG. 1. Opening 105 includes, near the top of platform 104, recess 106. Recess 106 is of sufficient depth and size to receive and support a cored head of lettuce when the core hole is placed over guide 8 with the balance of the lettuce head resting in recess 106.

Platform 104 connects to supports 102 and 103 with pivots 107 and 108 and is moveable upwardly from the horizontal position shown in FIG. 1 to a second position, as shown in FIG. 8. Pneumatic piston 109 is connected by rod clevis 110 to platform 104, and can move platform 104 from the position shown in FIG. 1 to the position shown in FIG. 7.

Below platform 101, and supporting platform 101, is chamber 25. Inside chamber 25 is valve 112 through which such a solution enters chamber 25. Valve 112 is connected to float mechanism 113, and opens when float 113 drops to a predetermined, adjustable level, usually at or near the middle of chamber 25. Chamber 25 also includes screen and screen housing 114. Aqueous solution in chamber 25 passes through screen housing 114, line 115, fitting 116 and check valve 117 into chamber 118. Chamber 118 includes bottom closure 119.

Inside chamber 118 is syphon 121. Chamber 118 and syphon 121 receive aqueous solution via line 115, fitting 116 and check valve 117. Pressurizing air enters chamber 118 through opening 122 via an air pressurizing line (not shown). As the air pressure increases in chamber 118, the aqueous solution in chamber 118 moves downwardly in chamber 118 and upwardly through syphon 121, and nozzle 123, then sprays upwardly into the area inside guide 8.

Figure 4:
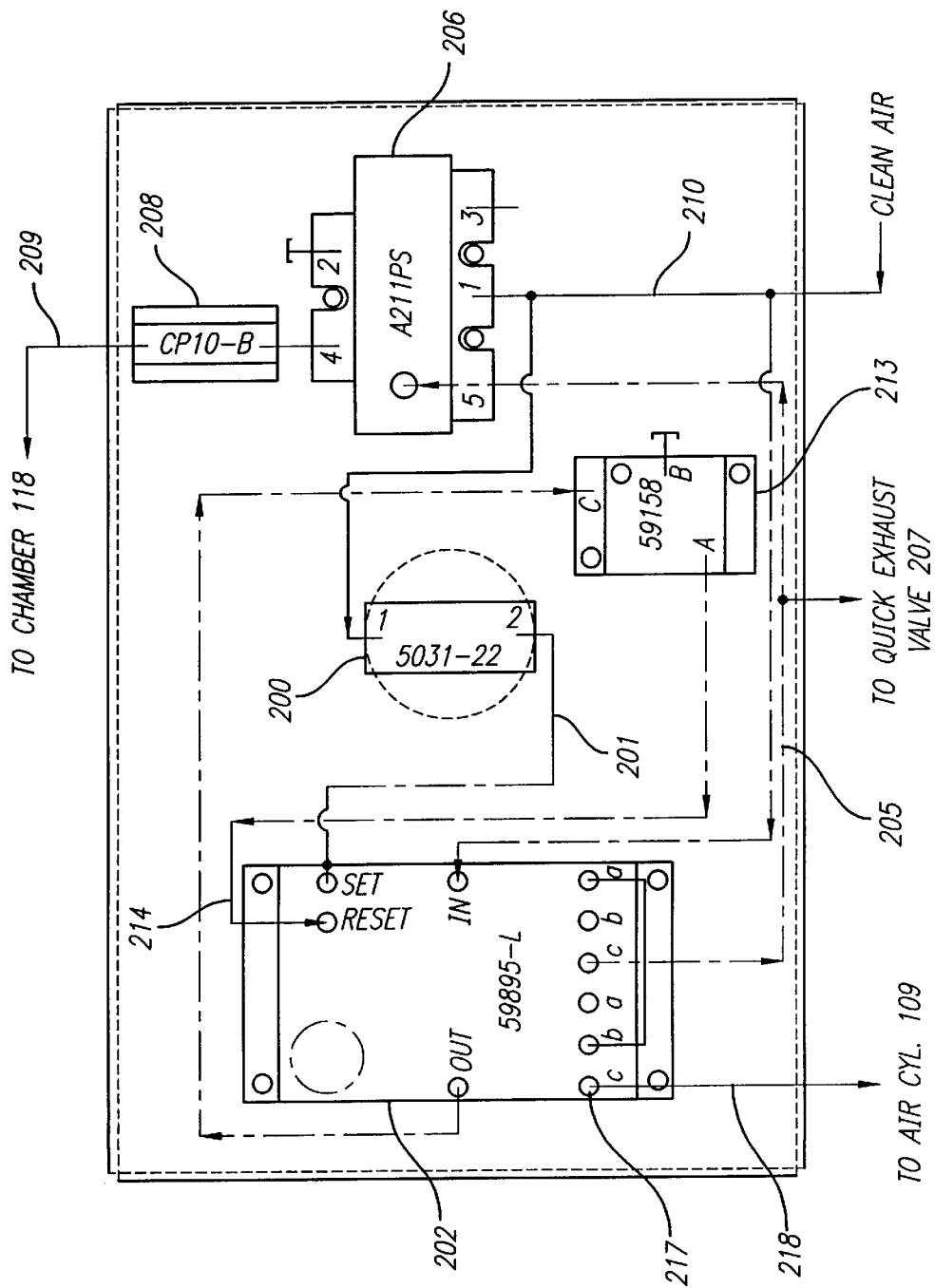
FIG. 4 is a schematic of a preferred embodiment of an air pressurizing system for the apparatus of FIGS. 1 to 3.

FIG. 4 shows a schematic of the air pressure system that operates aqueous wash apparatus 100. When a user pushes the momentary start button 400, switch 200 is activated. Switch 200 delivers an air pressure signal on line 201 to timer 202. Another air pressure signal then passes via line 205 to, and activates valve 206, and valve 207. Input Air (line 210) passes through check valve 208 and line 209 to chamber 118. After chamber 118 is pressurized, and the aqueous solution in chamber 118 is sprayed through nozzle 123 into the core hole of a cored lettuce head for a time determined by timer 202, air supply to chamber 118 ceases. After timer 202 times out, input air pressure is delivered through regulator valve 217 via line 218 to air cylinder 109 to move platform 104, propelling a cored lettuce head onto a conveyor (not shown). After a predetermined time passes, an air pressure signal from timer 213 passes to reset timer 202 and deactivate air cylinder 109 via line 214.

Figure 5:
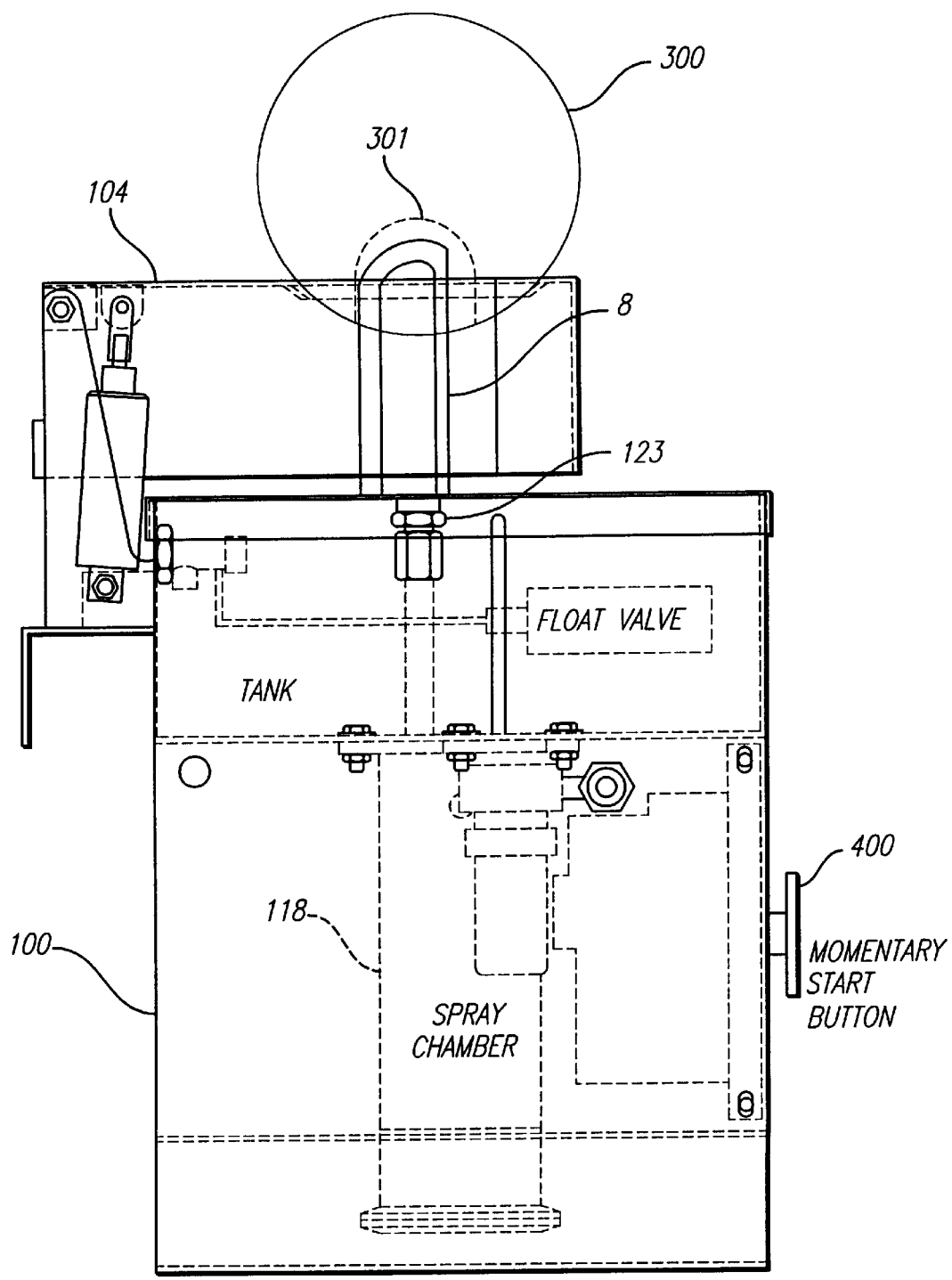
FIG. 5 shows the apparatus of FIGS. 1 through 4 with a cored lettuce head in place, ready for washing.
Figure 6:
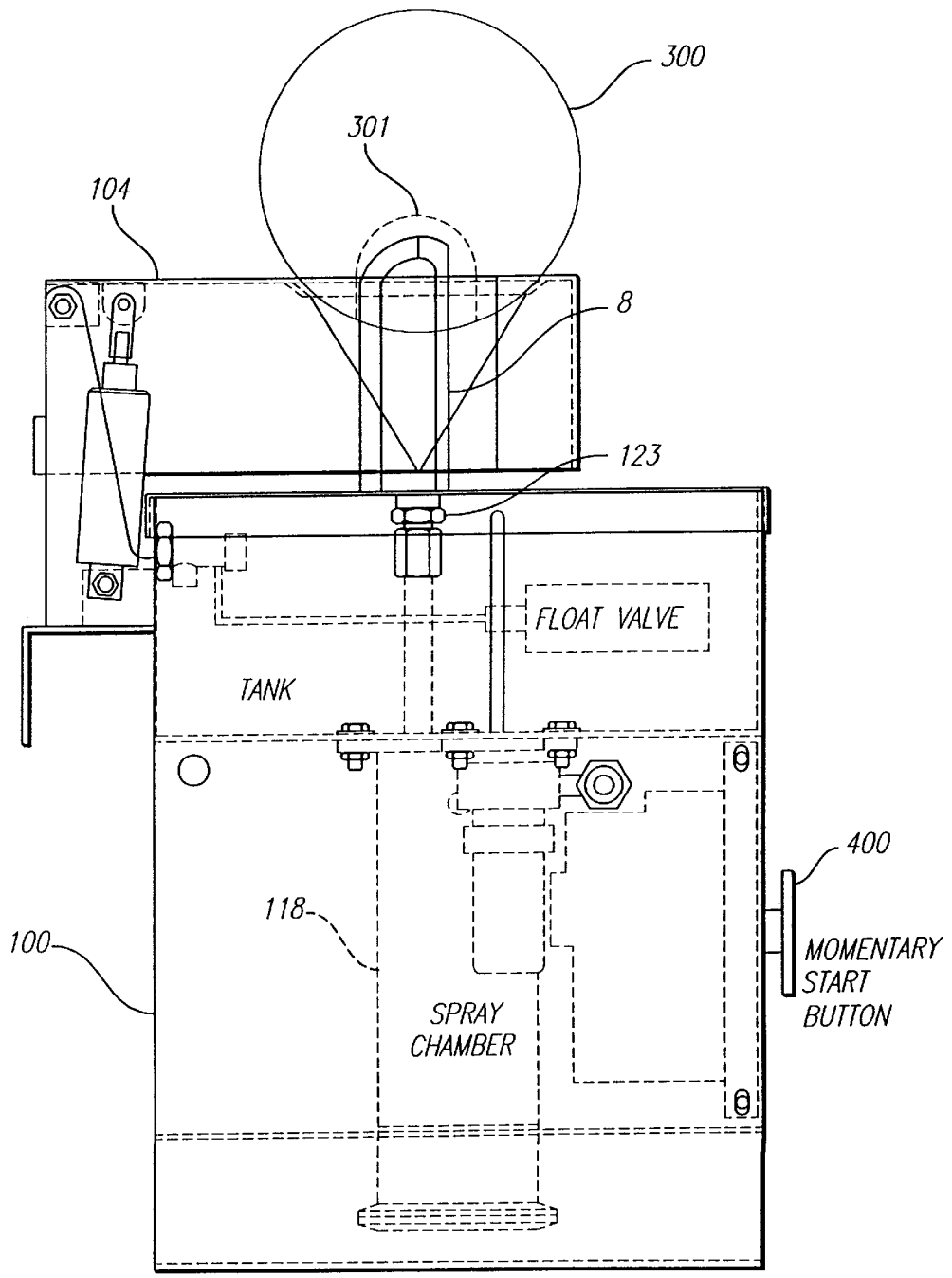
FIG. 6 shows the apparatus of FIG. 5, with an aqueous liquid washing spray passing upwardly into, and washing, the cored hole of the lettuce head shown in FIG. 5.
Figure 7:
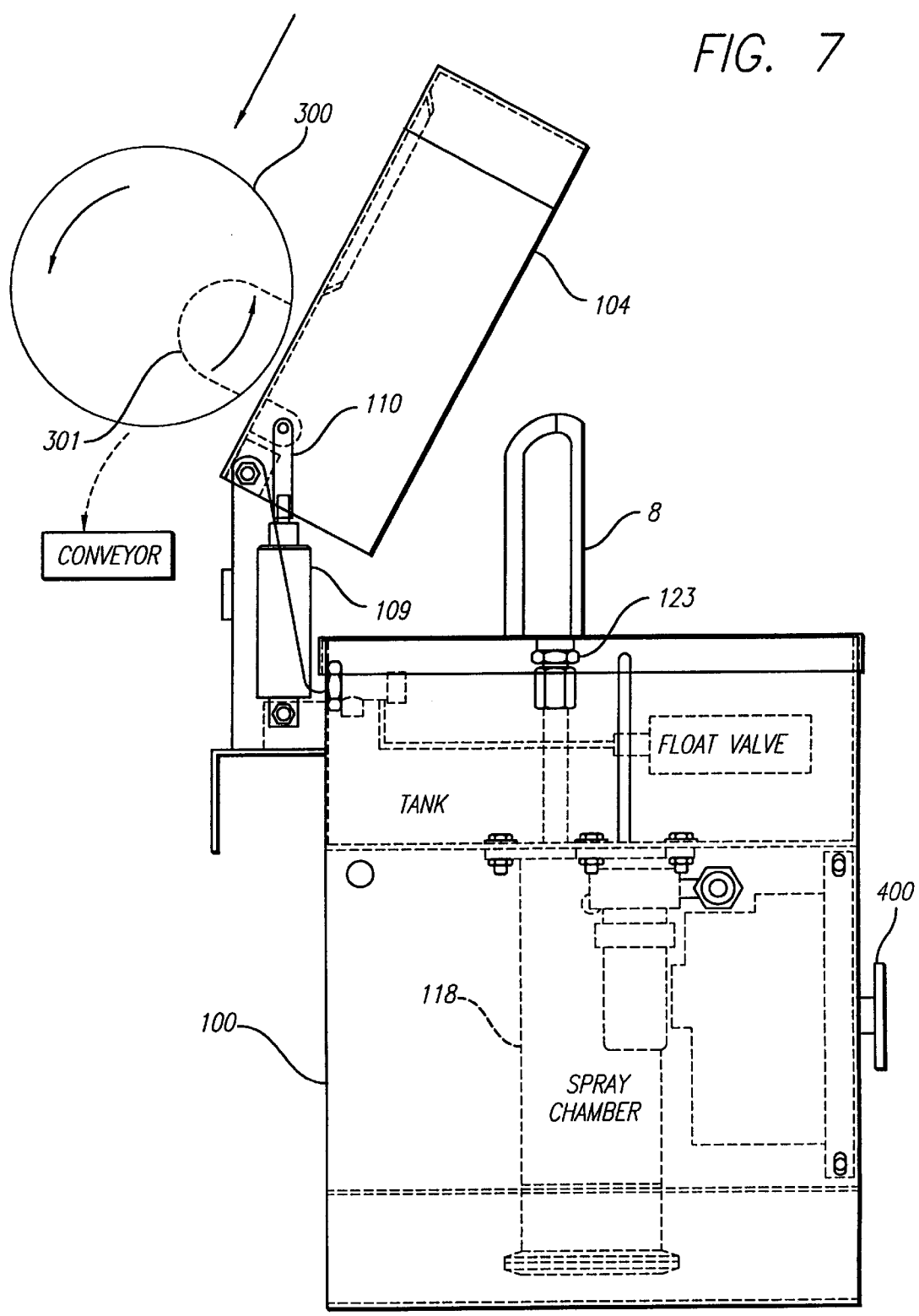
FIG. 7 shows the apparatus of FIG. 6 propelling the cored lettuce head, after washing of the core hole as shown in FIG. 6, onto a suitable conveyor (not shown).

FIGS. 5, 6 and 7 show the sequence of operations in the washing of a cored lettuce head 300 by apparatus 100. FIG. 5 shows cored lettuce head 300 placed on guide 8 with core hole 301 atop guide 8. In FIG. 6, an aqueous solution from chamber 118 is sprayed through nozzle 123 into lettuce core hole 301. In FIG. 7, platform 104 moves upwardly as the rod clevis 110 connected to piston 109 moves upwardly to deliver lettuce head 300 onto a suitable lettuce head conveyor belt.

What is claimed is:

1. A method of washing a cored head of lettuce comprising the steps of: placing said cored lettuce head in a position such that the cored hole faces downwardly with respect to an upwardly-directed spray of an aqueous solution;

directing said spray of an aqueous solution upwardly into said cored hole for a time and at a pressure sufficient to wash said cored hole; and pushing said cored lettuce head from said position and onto a conveyor for said cored Lettuce head.

2. The method of claim 1 wherein said placing step comprises placing said cored lettuce head onto a lettuce head guide that receives and protrudes into said cored hole.

3. The method of claim 1 further comprising providing a chamber for said aqueous solution and providing a pressurizing medium to said chamber to pressurize said aqueous solution in said chamber and to propel said aqueous solution into said cored hole.

* * * * *